United States Patent [19]

Yamazaki

[11] Patent Number: 4,595,286

[45] Date of Patent: Jun. 17, 1986

[54] SPREAD DOCUMENT COPYING METHOD WITH VARIABLE MAGNIFICATION CAPABILITY

[75] Inventor: Shuichi Yamazaki, Tokyo, Japan

[73] Assignee: Ricoh Company, Ltd., Tokyo, Japan

[21] Appl. No.: 705,105

[22] Filed: Feb. 25, 1985

[30] Foreign Application Priority Data

Mar. 1, 1984 [JP] Japan .............................. 59-37251

[51] Int. Cl.[4] .............................................. G03B 27/32

[52] U.S. Cl. .................................. 355/77; 355/14 R; 355/25

[58] Field of Search ............... 355/77, 8, 11, 25, 14 R, 355/14 C, 7

[56] References Cited

U.S. PATENT DOCUMENTS 4,417,805 11/1983 Kishi .

*Primary Examiner*—Richard A. Wintercorn
*Attorney, Agent, or Firm*—Cooper, Dunham, Clark, Griffin & Moran

[57] ABSTRACT

A spread document copying method for a copier having a variable magnification copying function is disclosed. In order to adequately copy right and left faces of a spread document even when magnifications other than a 1 magnification is selected, one of the two faces is imaged starting at a position associated with a value which is provided by dividing the length of copy sheets by the selected magnification.

5 Claims, 11 Drawing Figures

SPREAD DOCUMENT COPYING METHOD WITH VARIABLE MAGNIFICATION CAPABILITY

BACKGROUND OF THE INVENTION

The present invention relates to a spread document copying method for a copying machine with a variable modification copying function.

Recently, even a copier with variable magnifications has come to be furnished with a function of copying a document in a spread position. Such a function, which will hereinafter be referred to as a spread document copying function, is accomplished by bisecting a desired face of a book or like spread document into right and left faces and scanning the two faces to reproduce them on copy sheets.

Reference will first be made to FIG. 1 of the drawings for describing the general concept of the spread document copying function. In FIG. 1 and the other drawings, the left and right faces of a spread document will be called faces A and B, respectively. As shown, a spread document (book) 14 is laid on a contact glass 12 with a reference position provided by a document scale 10, while a scanner (not shown) scans the faces A and B of the document 14 to reproduce their images. The images of the faces A and B are sometimes transferred to separate copy sheets and sometimes to opposite surfaces of a single copy sheet.

It will be seen from the above that to copy the face B of a spread document the imaging start position (scanning start position of the scanner) needs be aligned with the end of the face B. Two different methods are available for controlling the imaging start position. One of them is to specify an imaging start position as desired by means of a manually operable lever (with a sensor) and produce images with a document divided into faces A and B. The problem with this approach is that an intricate control mechanism is required resulting in an increase in cost. In addition, the manual operation lacks in efficiency. The other known method is to select an imaging start position depending upon the size of a copy sheet (scanning length). While this second approach successfully solves the problem particular to the first approach, it is incapable of fully copying the face B in the case of magnifications other than a 1 magnification.

The drawback inherent in the second approach mentioned above will be discussed with reference to FIGS. 2-4.

FIG. 2 represents an copying operation with a 1 magnification (magnification $M=1$). In this condition, the length L of each of the faces A and B of the document 14 is equal to the length l of copy sheets 16 ($L=l$). The imaging operation starts at a point $P_A$ on the face A and at a point $P_B$ on the face B. The distance $l_B$ from the point $P_A$ to the point $P_B$ is equal to the length L of the surface A or B of the document 14 and the length l of the copy sheets 16 ($L=l=l_B$), so that both the faces A and B can be fully reproduced on the copy sheets 16. The 1 magnification copying, therefore, is free from the drawback previously described.

FIG. 3 shows a reduction copying operation (magnification $M<1$) in which case the length L of each face A or B is greater than the length l of copy sheets 16 ($L=l/M$). For this reason and because the distance $l_B$ between the points $P_A$ and $P_B$ is made equal to the length l of the sheets 16 ($l=l_B$), a rear end portion 18 of the face A is double-imaged while a rear end portion 20 of the face B is left non-imaged.

FIG. 4 represents an enlargement copying operation (magnification $M<1$). In this case, the length L of the surfaces A and B of the document 14 is smaller than the length l of the copy sheets 16 and the distance $l_B$ between $P_A$ and $P_B$ is made equal to the length l of the sheets 16 ($l=l_B$). As a result, a front end portion of the surface B cannot be imaged.

As described above, concerning the system which selects an imaging start position (scan start position in the scanning direction) in conformity to the size of copy sheets, 100% image reproduction cannot be guaranteed unless the magnification M is 1, even though the document size, copy sheet size and magnification may be adequate.

SUMMARY OF THE INVENTION

It is therefore an object of the present invention to provide a method which allows a copier to adequately reproduce bisected right and left faces of a spread document on copy sheets even when operated with a magnification other than 1.

It is another object of the present invention to provide a generally improved spread document copying method with a variable magnification capability.

A method of copying a spread document on copy sheets of a predetermined size to a predetermined magnification by scanning the document of the present invention comprises the steps of dividing the spread document to be scanned into two faces, and causing the scanner to start scanning the two faces at predetermined positions which are different from each other so as to image the two faces.

In accordance with the present invention, a spread document copying method for a copier having a variable magnification copying function is disclosed. In order to adequately copy right and left faces of a spread document even when magnifications other than a 1 magnification is selected, one of the two faces is imaged starting at a position associated with a value which is provided by dividing the length of copy sheets by the selected magnification.

The above and other objects, features and advantages of the present invention will become more apparent from the following detailed description taken with the accompanying drawings.

DESCRIPTION OF THE PREFERRED EMBODIMENTS

Figure 1:
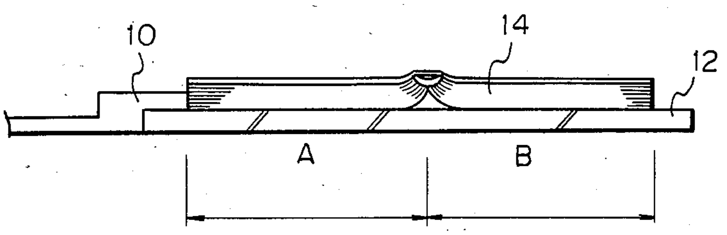
FIG. 1 is a schematic illustration of a spread document copying function.
Figure 2:
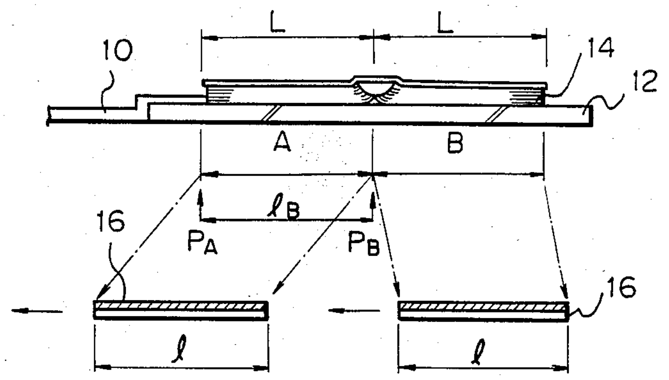
Fig. 2 PRIOR ART
FIGS. 2-4 show a drawback particular to a prior art spread document copying method.
Figure 3:
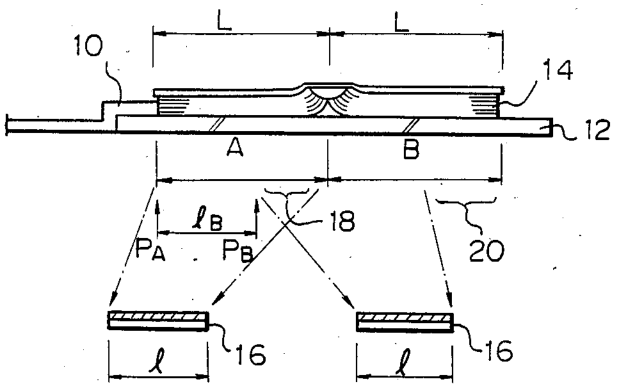
Fig. 3 PRIOR ART
Figure 4:
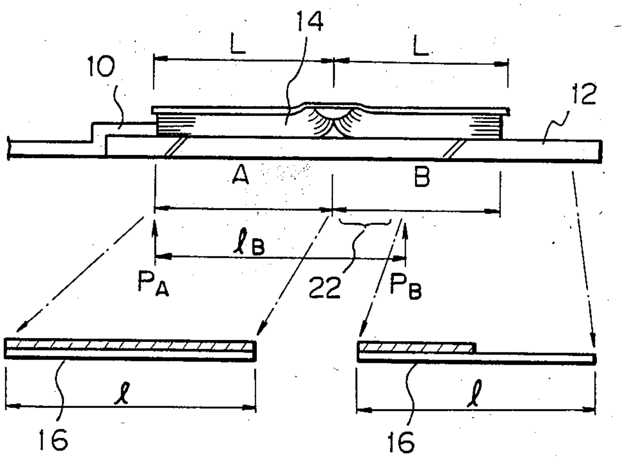
Fig. 4 PRIOR ART

While the spread document copying method with a variable magnification capability of the present invention is susceptible of numerous physical embodiments, depending upon the environment and requirements of use, substantial numbers of the herein shown and described embodiments have been made, tested and used, and all have performed in an eminently satisfactory manner.

In FIGS. 5–11 to which reference will be made hereinafter, the same elements as those shown in FIGS. 1–4 are designated by like reference numerals.

Figure 5:
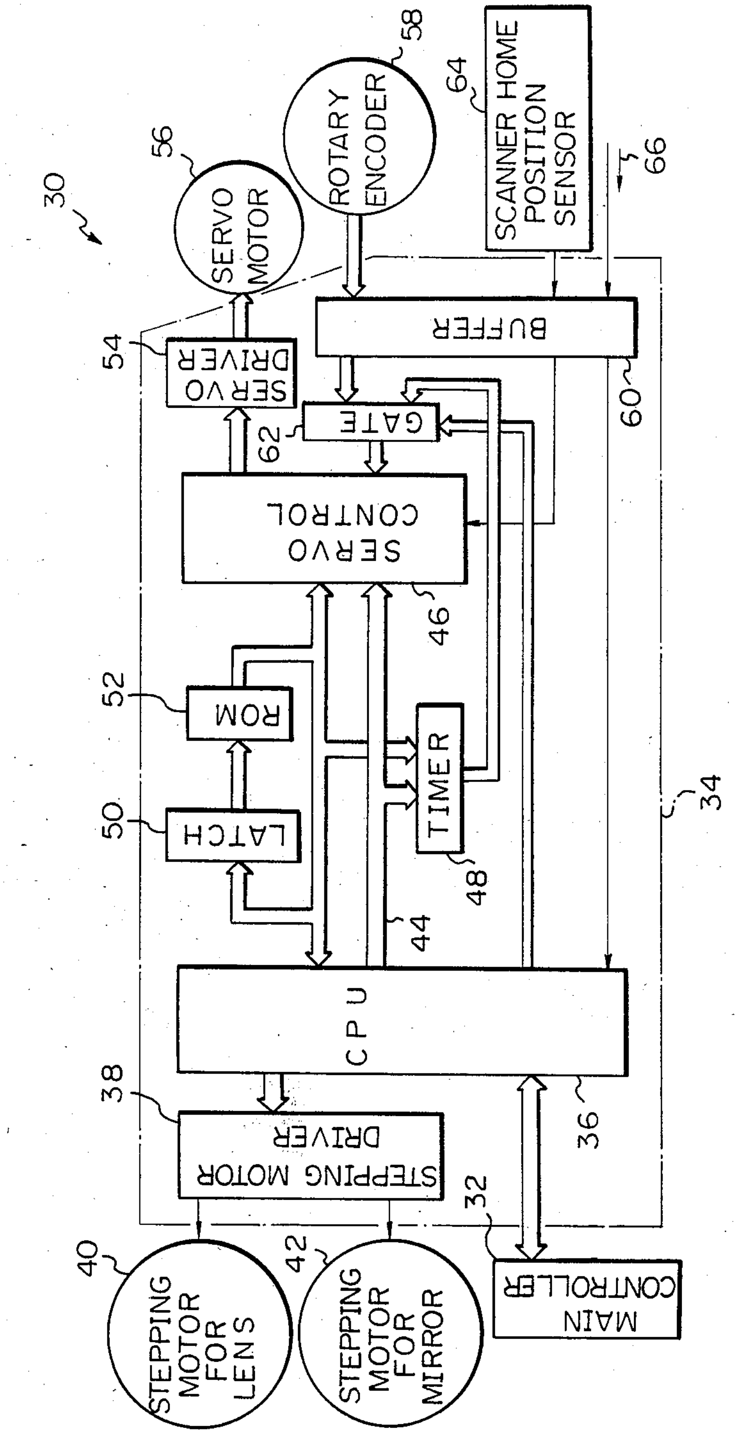
FIG. 5 is a block diagram of a control system for practicing a spread document copying method of the present invention.

Referring to FIG. 5, a control system for practicing the method of the present invention is shown and generally designated by the reference numeral 30. Magnification data (magnification: M), document size data (document length: L) and sheet size data (copy sheet length: l) are applied from a main control unit 32 to a central processing unit (CPU) 36 of an optics controller 34 which then determines an erase lamp turn-on timing. The document size data may be provided by sensor means (known in the art) mounted on an automatic document feeder (ADF) or a pressure plate, for example, or may be entered by the operator through an operation section. The CPU 36 controls a stepping motor 40 associated with a lens and a stepping motor 42 associated with a mirror via a stepping motor drive 38, thereby driving a lens and a second mirror (not shown) of an optical system. The CPU 36 is connected to a servo control circuit 46 and a timer 48 by a control bus 44. Connected to the CPU 36, servo control 46 and timer 48 each by a bus are a latch circuit 50, a read only memory (ROM) 52, etc.

The servo control 46 drives a servo motor 56 which is adapted to move a scanner (not shown) via a servo driver 54. A rotary encoder 58 is mounted in the servo motor 56 to deliver its output pulses to the servo control 46 by way of a buffer 60 and a gate 62. A signal associated with the home position of the scanner is applied from a scanner home position sensor 64 to the servo control 46 via the buffer 60, while a signal 66 associated with the home position of the stepping motor is applied to the CPU 36 via the buffer 60.

The erase lamp turn-on timing is dependent upon the position of the scanner in stroke and determined by counting output pulses of the rotary encoder 58. The erase lamp turn-on drive is performed by the main controller 32. The optics controller 34 delivers an erase lamp turn-on signal to the main controller 32 at a turn-on timing.

Figure 6:
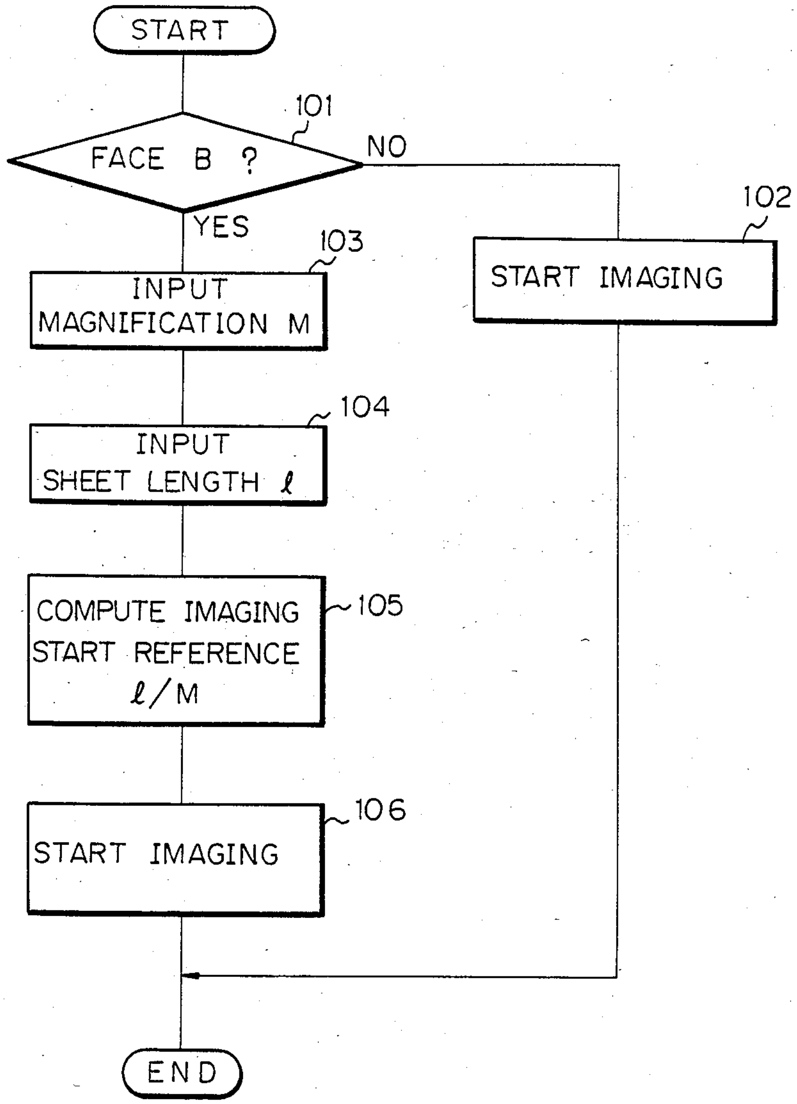
FIG. 6 is a flowchart representative of an operation for computing an imaging start position in accordance with one embodiment of the present invention.

Referring to FIG. 6, a flowchart for computing an imaging start position is shown. The computation starts with determining whether the face to be reproduced is A or B (step 101). If it is the face A and not the face B, the imaging start reference (imaging start position) is made "0" (step 102). If it is the face B, on the other hand, a magnification M is inputted (step 103) and, then, a length l of sheets (step 104). Thereafter, an imaging start reference $l_B = l/M$ is computed (step 105) and scanning begins at the position l/M (step 106).

Figure 7:
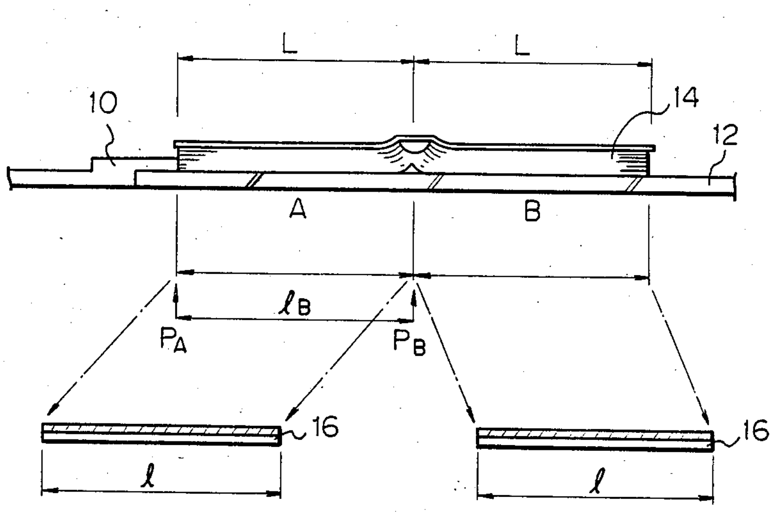
FIGS. 7-9 are schematic diagrams showing imaging operations attainable with the embodiment of FIGS. 5 and 6.
Figure 8:
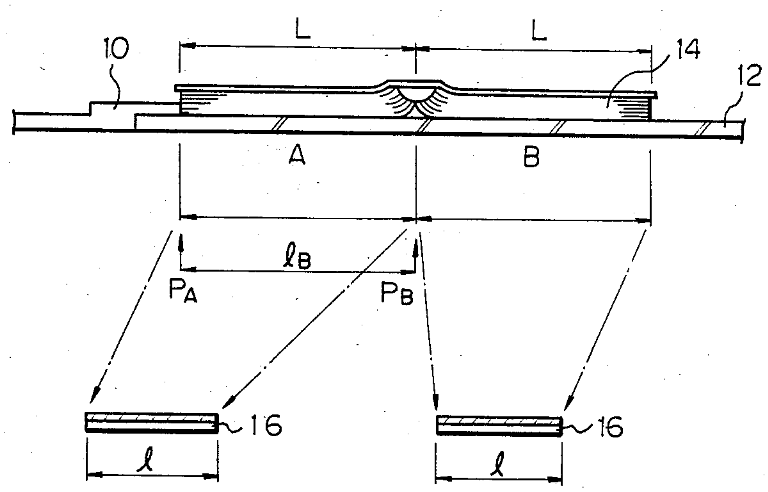
Figure 9:
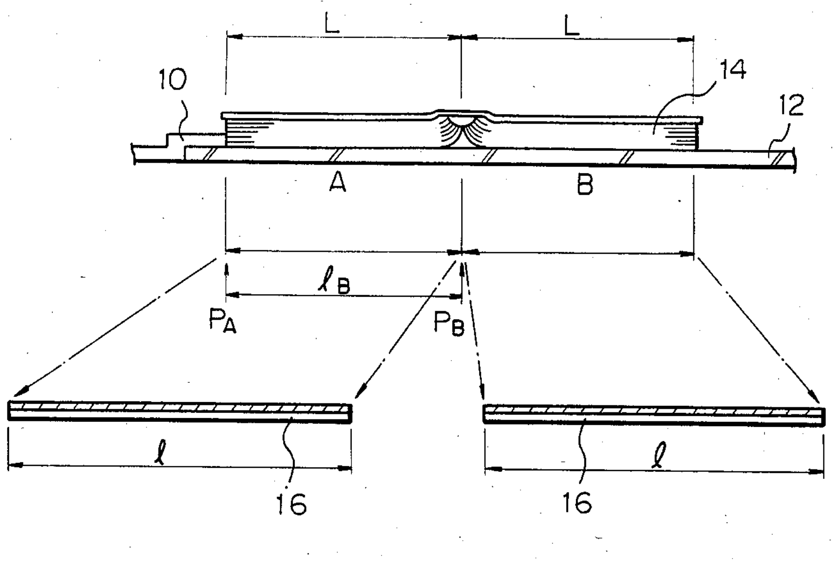

Imaging operations in accordance with the embodiment represented by FIGS. 5 and 6 are shown in FIGS. 7–9.

In FIG. 7 which is representative of a 1 magnification operation, the magnification M is 1 so that imaging begins at a position $P_B$ which is associated with $l_B = l/M = l$. As shown, 100% image reproduction is insured for both the faces A and B.

In FIG. 8 showing a reduction copying operation, imaging starts at a position $P_B$ which is associated with $l_B = l/M = L$ and, therefore, 100% image reproduction is achievable for both the faces A and B. Such eliminates the undesirable occurrence that the rear end portion of the face A is double-imaged or the rear end portion of the face B is left non-imaged, as has been discussed with reference to FIG. 3.

Further, in FIG. 9 representative of an enlargement copying operation, imaging also starts at a position associated with $l_B = L/M = L$ so that 100% image reproduction is attained for both the faces A and B. This prevents the front end portion of the face B from being omitted in contrast to the case shown in FIG. 4.

Figure 11:
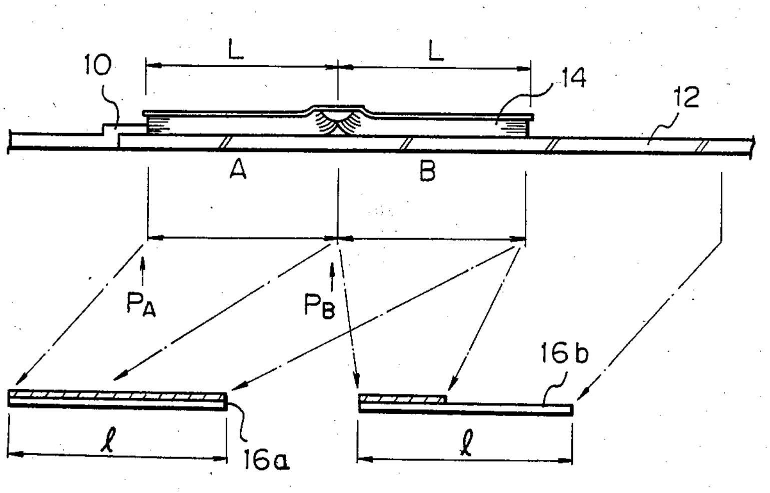
FIG. 11 is a schematic diagram showing an imaging operation in accordance with the embodiment of FIGS. 5 and 10.
Figure 10:
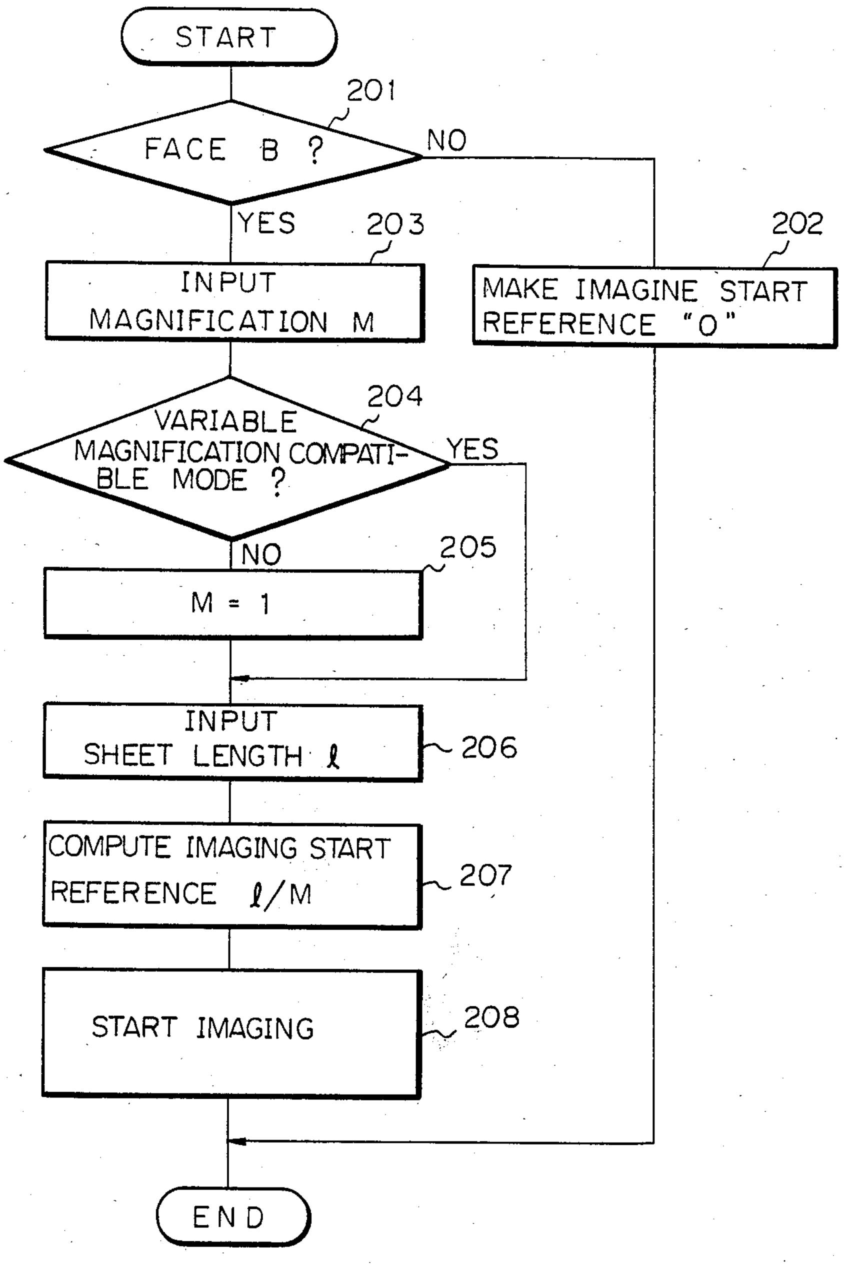
FIG. 10 is a flowchart representative of an operation for computing an imaging start position in accordance with another embodiment of the present invention.

Referring to FIGS. 10 and 11, another embodiment of the present invention is shown. The flowchart of FIG. 10 represents a sequence for computing an imaging start position when the magnification is not standard one ($M \neq l/M$). Reproduction of the face A is performed with the imaging start reference made "0" (steps 201 and 202). To reproduce the face B, a magnification M is entered (steps 201 and 203) and, then, whether mode switching means has selected a variable magnification compatible mode is determined (step 204). If such a mode has been selected, an imaging start reference is computed as is shown in FIG. 6. If not, then a 1 magnification is set up (step 205), and then an imaging start reference is obtained and reproduction of the face B is started (steps 206–208).

FIG. 11 shows an imaging condition which occurs when the variable magnification compatible mode has not been selected (similar to the prior art system). As shown, both the faces A and B can be reproduced on one copy sheet 16a and only the face B on the other copy sheet 16b.

In summary, it will be seen that the present invention provides a spread document copying method with a variable magnification capability which insures 100% image reproduction of faces A and B of a spread document so long as the magnification remains standard ($M = l/M$). This is accomplished by causing a scanner to start a scanning stroke at a position associated with a value which is provided by dividing a length of a copy sheet by a selected magnification.

Various modifications will become possible for those skilled in the art after receiving the teachings of the present disclosure without departing from the scope thereof.

What is claimed is:

1. A method of copying a spread document onto copy sheets of a predetermined size to a predetermined magnification by scanning the document, comprising the steps of:

(a) dividing the spread document to be scanned into two faces; and (b) commencing the scanning of the two faces at predetermined positions which positions are different from each other so as to image the two faces, which comprises commencing said scanning at a predetermined home position when the first of the two faces is to be reproduced, and commencing the scanning at a position whose displacement from the home position is determined by dividing the size of the copy sheet by the magnification when the second of the two faces is to be imaged.

2. A method of claim 1, wherein which one of the two faces of the spread document is to be imaged is determined.

3. A method of claim 1, wherein determining the commencement point of the scanning position for imaging of the second face comprises using the value of the magnification and the size of the copy sheet to compute said commencement point.

4. A method of copying a spread document with a copying machine which scans an optical system along the document, wherein the document has two faces which are adjacent each other along the direction of the scan and are copied on respective copy surfaces which may be on separate copy sheets, on the opposite sides of a single copy sheet or on separate portions of the same copy sheet surface, and wherein the optical system has a home position, comprising the steps of:

selecting the copy surface size and a magnification or reduction factor; and commencing the scanning of at least one of the faces of the spread document at a position whose displacement from the home position is determined on the basis of the ratio between the selected copy surface size and the selected magnification or reduction factor.

5. A method of copying an original with a copying machine which scans an optical system along a platen on which the original is placed, wherein the original has two faces which are adjacent each other along the direction of the scan and are copied on respective copy sheet surfaces, and the optical system has a home position, comprising the steps of:

selecting the copy size and a magnification or reduction factor; and commencing the scanning of at least one of the faces at a position whose displacement from the home position is determined on the basis of the ratio between the copy size and the selected magnification or reduction factor.

* * * * *